United States Patent [19]
Gottlieb et al.

[11] 3,894,157
[45] July 8, 1975

[54] COLOR STABILIZATION IN FREEZE-DRIED CARROTS WITH ASCORBIC AND ERYTHORBIC ACIDS

[75] Inventors: Danny M. Gottlieb; Jack R. Linaberry, both of Modesto, Calif.

[73] Assignee: General Foods Corporation, White Plains, N.Y.

[22] Filed: June 4, 1973

[21] Appl. No.: 366,956

[52] U.S. Cl. ............... 426/268; 426/545; 426/327; 426/640; 426/385
[51] Int. Cl. ........................... A23b 7/04; A23b 7/10
[58] Field of Search ............ 426/228, 72, 262, 182, 426/183, 268, 311, 384, 385, 327, 328; 252/407

[56] References Cited
UNITED STATES PATENTS

| | | | |
|---|---|---|---|
| 2,709,657 | 5/1955 | Campbell et al. | 426/323 |
| 2,723,202 | 11/1955 | Rivoche | 426/385 |
| 2,780,551 | 2/1957 | Guadagni | 426/268 |
| 3,188,750 | 6/1965 | Davis et al. | 426/384 |

OTHER PUBLICATIONS

Chemical Abstracts, Vol. 75, 1971, 139542v, Lempka et al.
Chemical Abstracts, Vol. 76, 1972, 98143r, Ramana et al.
Chemical Abstracts, Vol. 53, 1959, 17361f, Gstirner et al.

*Primary Examiner*—Norman Yudkoff
*Assistant Examiner*—Curtis P. Ribando
*Attorney, Agent, or Firm*—Bruno P. Struzzi; Thomas V. Sullivan; Michael J. Quillinan

[57] ABSTRACT

An aqueous ascorbic or erythorbic acid solution infused throughout decorticated, blanched subdivided carrots just prior to freezing effects reduction of color loss in freeze-dried carrot during storage.

5 Claims, No Drawings

COLOR STABILIZATION IN FREEZE-DRIED CARROTS WITH ASCORBIC AND ERYTHORBIC ACIDS

BACKGROUND OF THE INVENTION

Freeze-dried carrots exhibit a "whitening" or fading in color and quality. Prior art workers have attributed this undesirable color change to an oxidative process. Agents responsible for food pigment in the case of carrots (carotenoids) seemed to be variously effected by processing conditions, particle surface and structure and storage conditions (heat, light). The primary purpose of this invention is to provide an improved freeze-dried carrot which when packaged will better retain color values and other quality factors during storage. Ascorbic and erythorbic acid has been suggested generally as an antioxidant in food systems to prevent oxidation of oxygen-sensitive food and have found use in stabilization of meats and fruits such as canned peaches. However, so far as is presently known, ascorbic acid and erythorbic acid have not been employed successfully or to advantage in the art of dehydrated carrot color control.

STATEMENT OF THE INVENTION

In accordance with the present invention, a dilute solution of ascorbic acid or erythorbic acid is infused into a decorticated (peeled) subdivided carrot which has been blanched and partially cooked, whereupon the coated and subdivided carrot piece is frozen preferably at a slow rate and then freeze-dried to a moisture content of two to three percent.

The acid used may be L or D Ascorbic acid or L or D isoascorbic acid (erythorbic acid) and the acid salts thereof. Preferably the acid will be 1–3% of an aqueous solution. The acid will be applied at a pH below 5 and the level of acid by weight of pre-cooked carrot pieces will generally be a minor fraction of 1%; typically 100 lbs. of ascorbic acid in a 1–3% solution will be applied to 50,000 lbs. of carrot dices by a fine spray system prior to individual freezing thereof and subsequent freeze drying. The necessary uniform application and maximum product benefits have been demonstrated with multiple spray heads directing solution on carrots as they are being rotated on an oscillating moving belt.

Generally the solution will be applied to peeled carrot dices which have been blanced and partially cooked to inactivate enzymes prior to freezing. The fresh mature carrot after peeling and dicing may be blanched in boiling water and cooked for, say 10 minutes, and cooled, whereafter the acid solution will be sprayed onto the carrot piece.

The freeze-dried carrot product of this invention held in the presence of light exhibits the fixation of original color values by appreciable retardation in loss thereof during storage. The exact mechanism whereby this retardation operates has not been fully defined. Raw carrots contain primarily $\alpha$-Carotene, $\beta$-Carotene, and $\delta$-Carotene chemical color pigments which give carrots their Orange/Yellow color values. Normally, when these latter pigments are subjected to food processing variables (e.g., heat, light, dry storage degradation, etc.), the pigments undergo degradation and loose their appreciative color values. These pigments absorb oxygen from the air, and give rise to colorless oxidation products which usually can be described as chemical reaction of autoxidation (atmospheric oxidation) producing malodor and malflavor. Specifically, in the presence of light at relative room temperatures, the pigments become photosensitive in the presence of oxygen and react to lose most of their color values. This can be drastically exhibited in freeze-dried carrot products. By treating frozen carrot dices prior to freezing and freeze drying with Ascorbic or erythorbic acid, we found that the color values are 'fixed' or appreciably retarded. However, it is believed that by reason of the blanching and cooking, physical changes are induced in the carrot piece which permit infusion of the antioxidant to the inter- and intra-cellular structure of a carrot so that oxidation of carotenoids is retarded, which infusion is further enhanced by the change in turgor caused by freezing slow enough to grow large non-amorphous crystals after application of the acid solution.

The invention will now be described by reference to the accompanying operative example.

OPERATIVE EXAMPLE

Carrots were trimmed, peeled, cleaned and then diced to produce pieces measuring 1/8 × 1/4 × 1/4 inch. The dices were then fed in a continuous, uniform manner to a rotary immersion water blancher adjusted to blanch at a water temperature of 210°F for 4 minutes. The dices were then discharged from the blancher onto an inspection belt to remove defects. The defect-free dices were then hydrocooled in refrigerated water and dewatered in a dewatering shaker immediately ahead of the system for applying ascorbic acid solution. The dices were sprayed with a 3% ascorbic acid solution at a ratio of about 1 part of solution to 10 parts of product and under conditions sufficient to effect substantially uniform coating and absorption of the solution onto the dice, the rate of application being such as to also permit any unabsorbed solution to run off prior to freezing. The dices were turned over (rotated) by a double oscillating device on a moving belt during spray impingement. The dices were then evenly fed through a freezer to achieve a product temperature of −10° to −20°F. The product was frozen over a period of approximately 5 minutes. The frozen product was loaded onto freeze drying trays in a cold storage transfer room maintained at 10°F at an approximate loading of 2 lbs. per square foot. The pieces were then freeze dried in a batch freeze dryer over a cycle time of approximately 12 hours to a final moisture content of 2.5% (broadly 2.0 –3.0%) and under a vacuum of 300–500 microns; the freeze dryer had a maximum platen temperature of 170°F generated by the heat transfer medium used to supply the latent heat of sublimation, and the product temperature never exceeded 135°F. The product thus produced could be stored for long periods (1 year) at a temperature less than 40°F and for shorter intervals (6 months) at room temperature (70°F).

What is claimed is:

1. Process of stabilizing color in dehydrated carrots which comprises decorticating carrots, subdividing them into sliced and diced form, blanching and cooking the resulting carrot pieces, infusing a solutions of an acid selected from the group consisting of ascorbic, erythorbic and salts thereof into the pieces, freezing the pieces and freeze drying the frozen pieces to a stable moisture content.

2. The produce of the process of claim 1.

3. Process of stabilizing color in dehydrated carrots which comprises decorticating carrots and subdividing them into a sliced or diced form, blanching and cooking the resulting carrot pieces, infusing a solution of an acid selected from the group consisting of ascorbic, erythorbic and salts thereof into the pieces, freezing the pieces under conditions which will result in large non-amorphous water ice crystals; and freeze drying the frozen pieces to a stable moisture content.

4. Process of claim 2 wherein said acid is present at a level of 1–3% of the aqueous solution and is applied at a ph below 5.0.

5. The process of claim 2 wherein said acid is applied at a level of less than 1% by weight of the cooked carrot pieces.

* * * * *